June 10, 1958     O. V. SAUNDERS     2,837,816
METHOD OF MANUFACTURING SINGLE AND DOUBLE DOORS
Filed Aug. 30. 1954     8 Sheets-Sheet 1
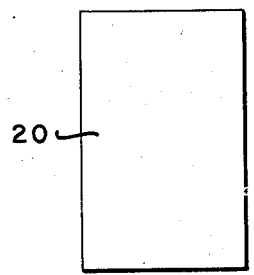
Fig. 1
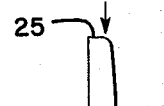
Fig. 2
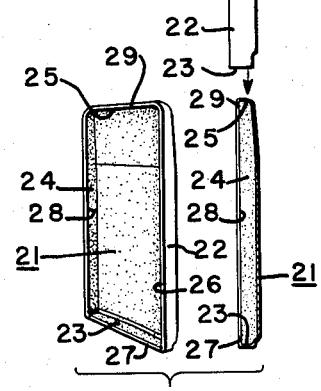
Fig. 3
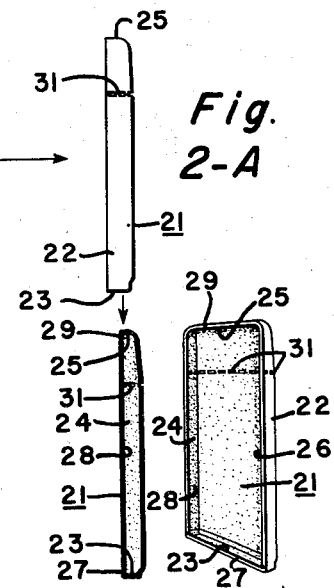
Fig. 2-A
Fig. 3-A
Fig. 3-B
Fig. 3-C
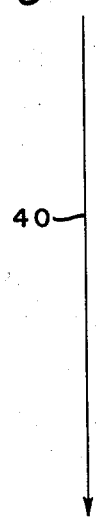
INVENTOR.
Orson V. Saunders
BY
His Attorney June 10, 1958  O. V. SAUNDERS  2,837,816
METHOD OF MANUFACTURING SINGLE AND DOUBLE DOORS
Filed Aug. 30, 1954  8 Sheets-Sheet 2
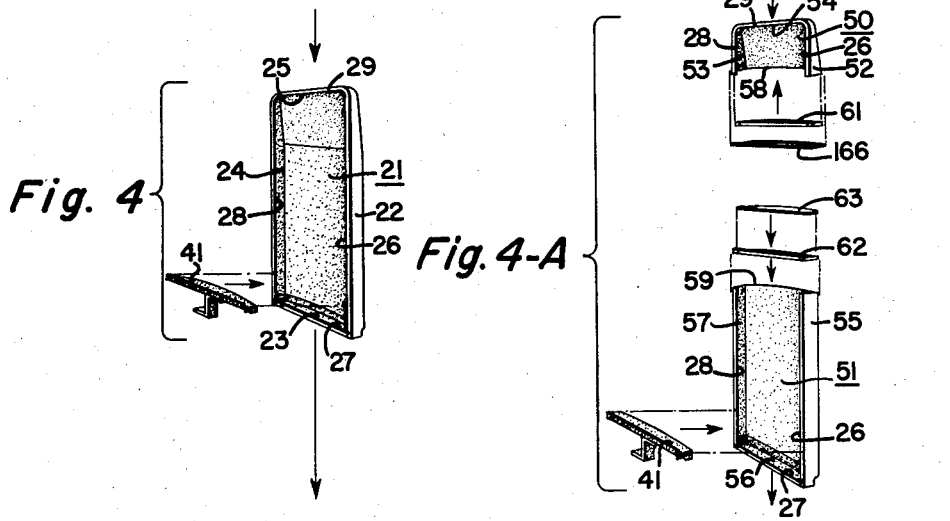
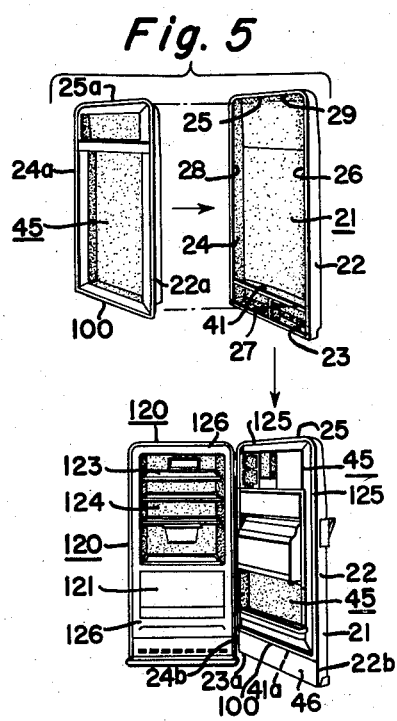
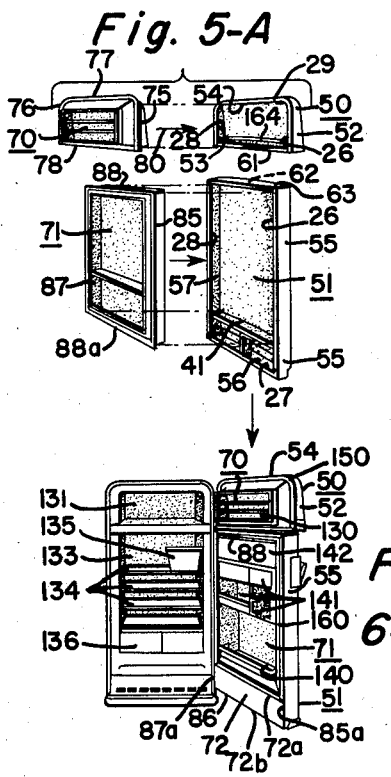
Fig. 6
INVENTOR.
Orson V. Saunders
BY
His Attorney

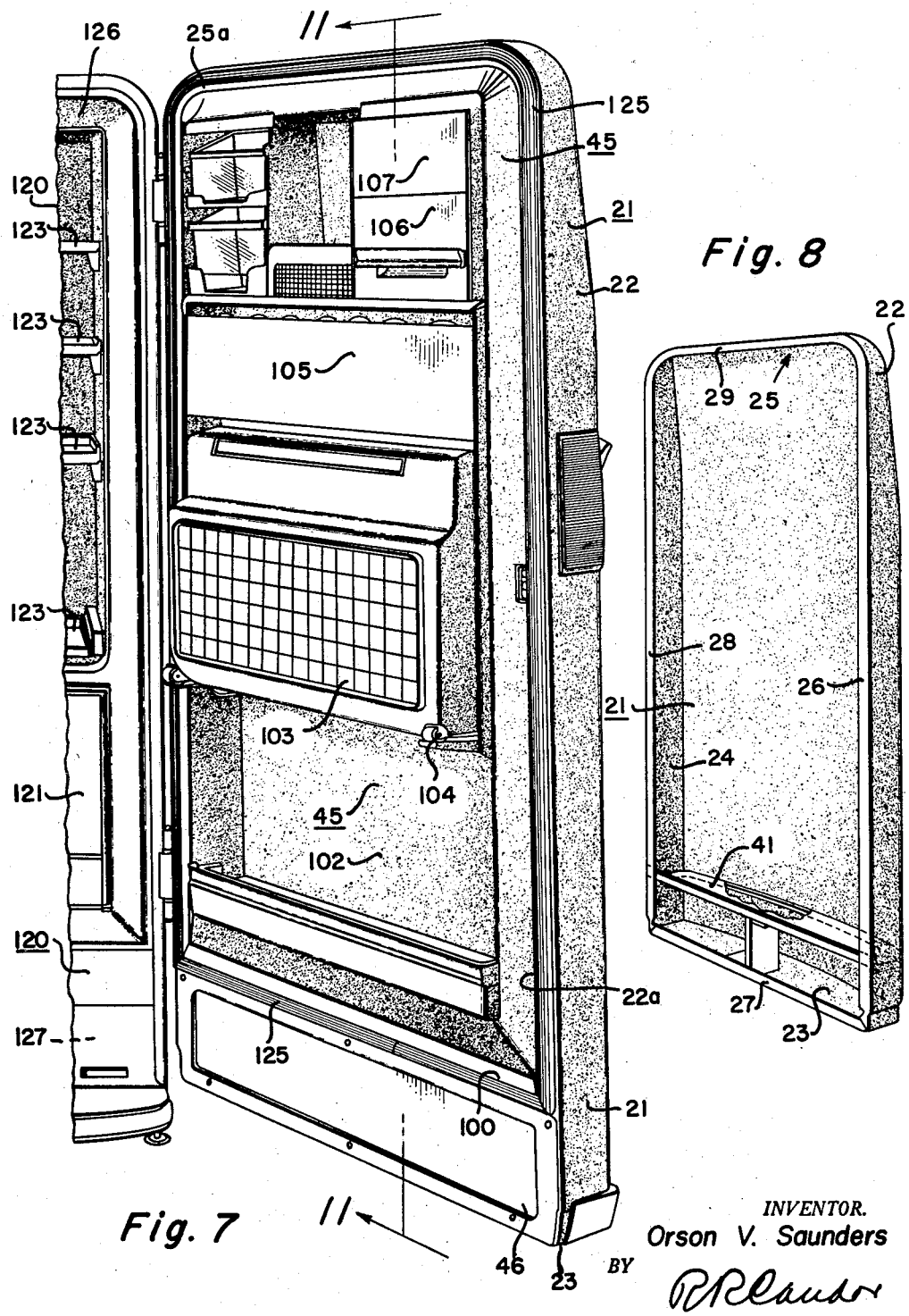

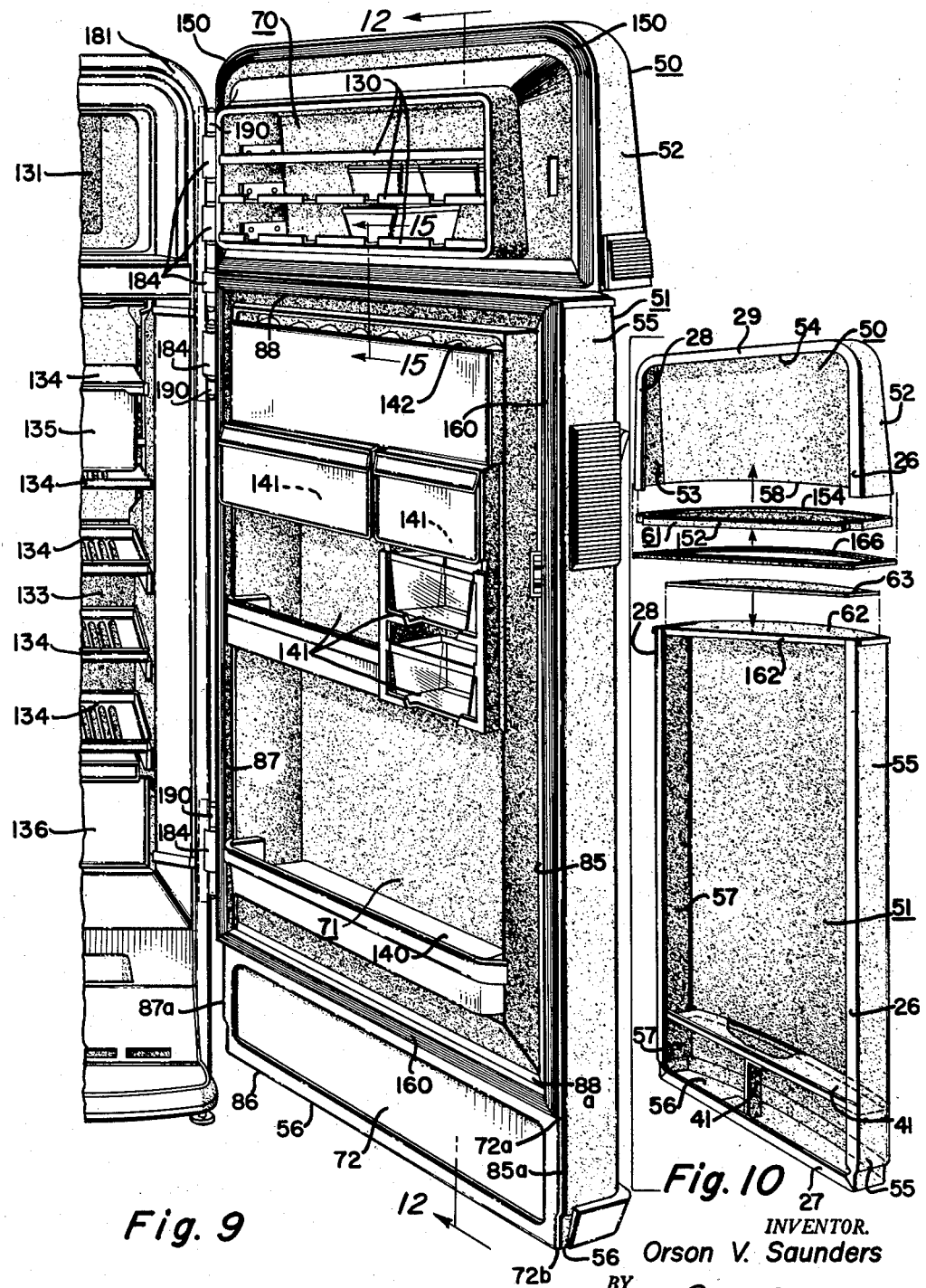

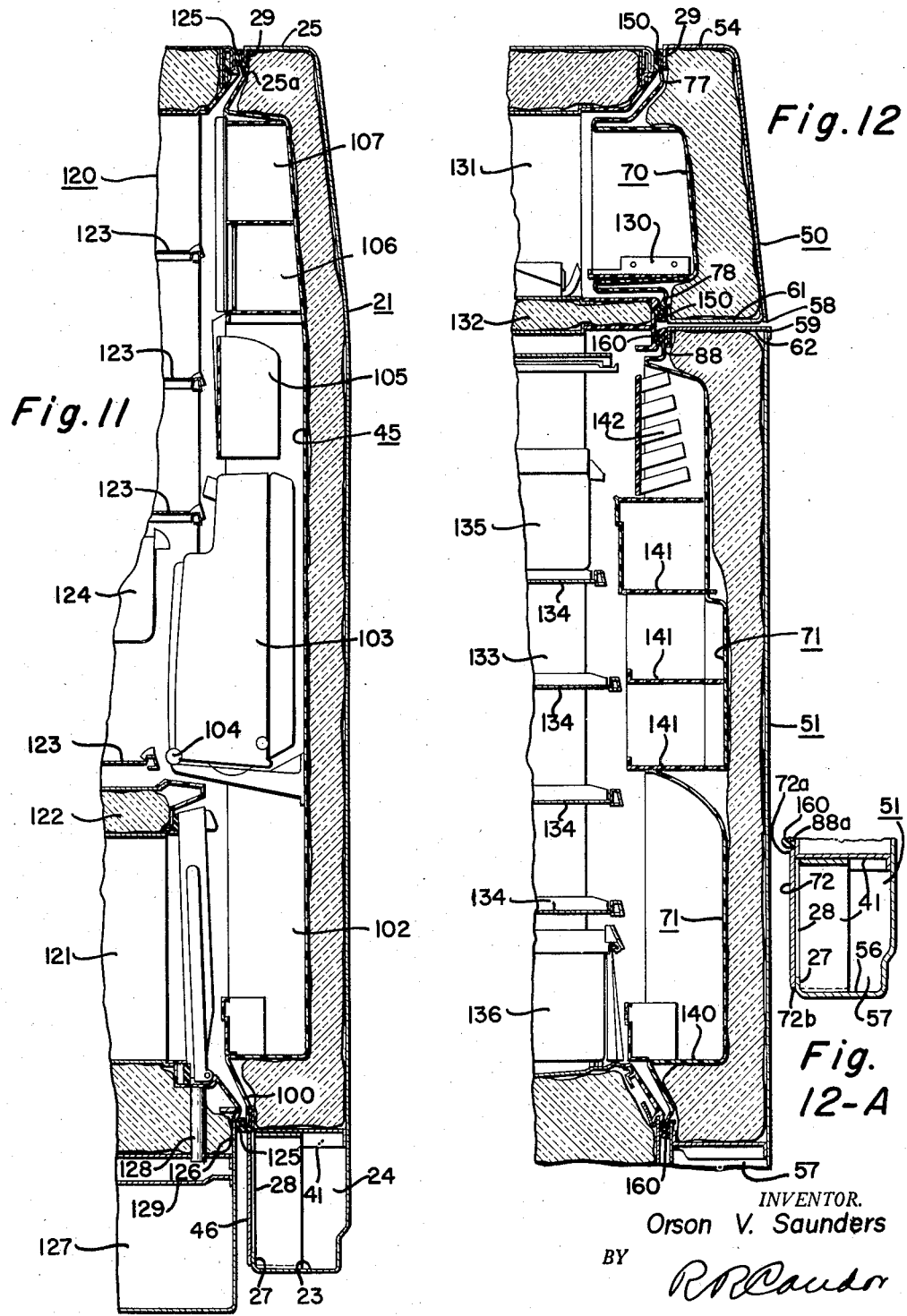

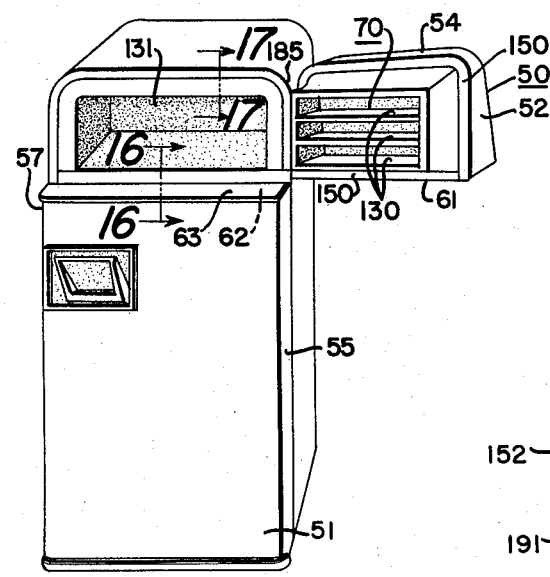
Fig. 13
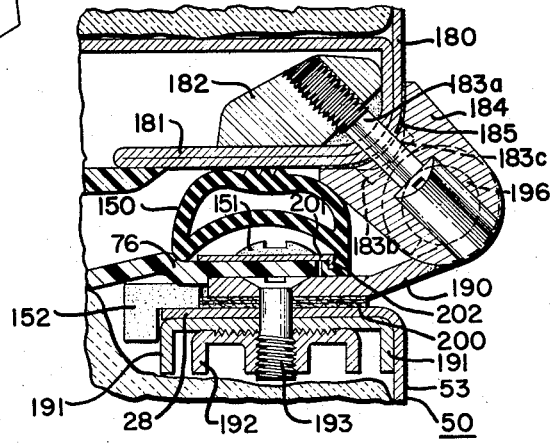
Fig. 14
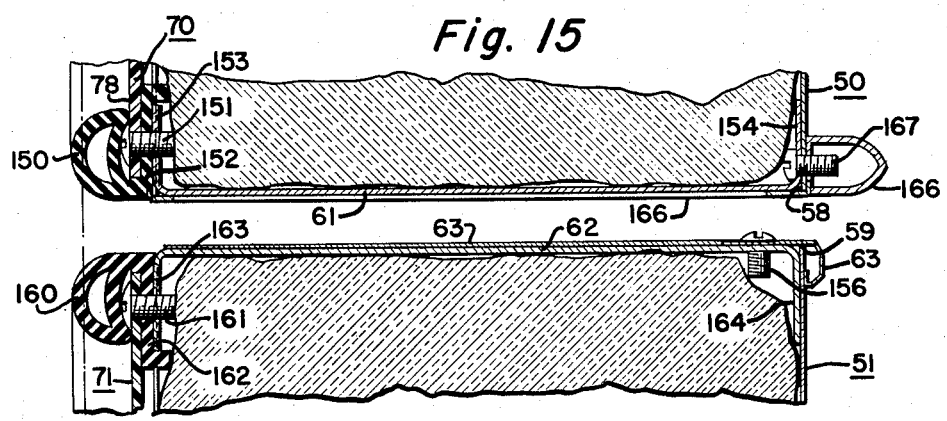
Fig. 15
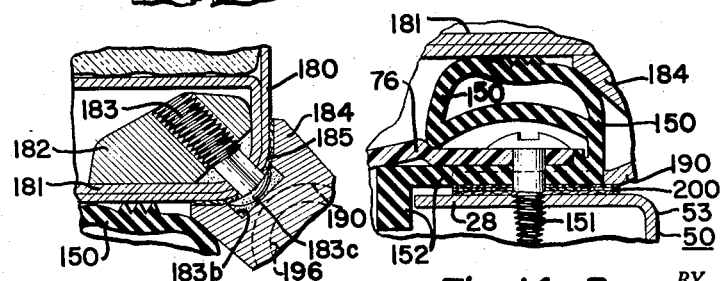
Fig. 14-A
Fig. 14-B June 10, 1958 O. V. SAUNDERS 2,837,816
METHOD OF MANUFACTURING SINGLE AND DOUBLE DOORS
Filed Aug. 30, 1954 8 Sheets-Sheet 7

INVENTOR.
Orson V. Saunders
BY
His Attorney

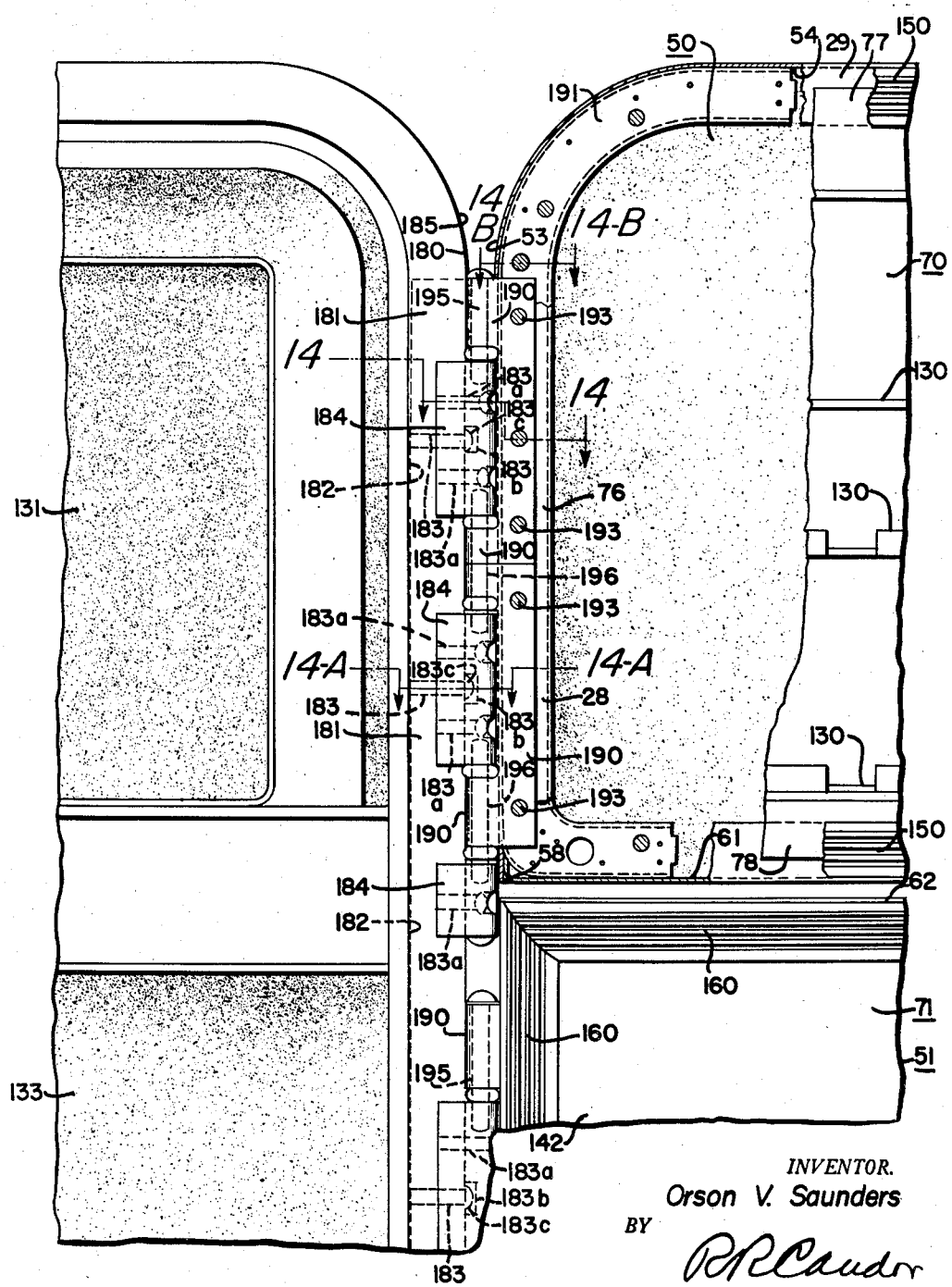

United States Patent Office 2,837,816
Patented June 10, 1958

2,837,816

METHOD OF MANUFACTURING SINGLE AND DOUBLE DOORS

Orson V. Saunders, Dayton, Ohio, assignor to General Motors Corporation, Detroit, Mich., a corporation of Delaware Application August 30, 1954, Serial No. 453,016

7 Claims. (Cl. 29—414)

This invention relates to method of manufacturing single and double doors.

Some of the users of multiple temperature refrigerators prefer a type in which a single outer front door is provided, while others prefer a refrigerator having a plurality of separate outer front doors. The manufacture of these different types of doors heretofore has required a large outlay of capital for individual tools for such different doors.

An object of this invention is to provide a method of manufacturing quantities of substantially similarly sized refrigerators, some of which have a single outer front door, while others have two separate adjacent outer front doors, utilizing a substantial amount of the same tools in manufacturing the single door and the two separate doors.

Another object of this invention is to provide a refrigerator having separate adjacent outer front doors, which doors have front faces adapted to be produced by cutting a single front face which covers substantially the same area which is covered by the two doors.

Another object of this invention is to provide a refrigerator having a plurality of front doors which are separated by caps which are parallel and closely adjacent to each other, to reduce the transfer of heat along such adjacent edges of the doors.

Another object of this invention is to provide a refrigerator with upper and lower doors in which the lower door is provided with a flat cover cap, adaptable for use as a temporary shelf while rearranging the contents of the upper refrigerator compartment.

Further objects and advantages of the present invention will be apparent from the following description, reference being had to the accompanying drawings wherein a preferred embodiment of the present invention is clearly shown.

In the drawings:

Figures 1 to 6 show, diagrammatically, various steps in the method of producing a refrigerator having a single outer front door.

Figures 2–A, 3–A, 3–B, 3–C, 4–A, 5–A and 6–A show, diagrammatically, various steps in the method of producing the refrigerators having two doors, and utilizing the same front pan tool equipment which is used for the production of the single door refrigerator.

Figure 7 is a perspective view of a portion of a refrigerator, showing the rear side of the single outer front door.

Figure 8 is a reduced perspective of the front pan of the single outer front door shown in Figure 7.

Figure 9 is a perspective view of a part of a refrigerator, showing the rear sides of its separate outer front doors.

Figure 10 is a reduced perspective of the front metal faces of the two doors and details of the cap constructions of the doors shown in Figure 9.

Figure 11 is a vertical cross-sectional view of the single door construction taken along the line 11—11 of Figure 7, with the door in closed position.

Figure 12 is a vertical cross-sectional view of the two-door construction taken along the line 12—12 of Figure 9, with the doors in closed position.

Figure 12–A is a lower continuation of Figure 12.

Figure 13 is a front perspective view of the two-door refrigerator with the upper door in open position.

Figure 14 is an enlarged horizontal cross-sectional detail taken along the line 14—14 of Figure 18, with the doors in closed position.

Figure 14–A is a cross-section similar to Figure 14, taken along line 14A—14A of Figure 18.

Figure 14–B is a cross-section similar to Figure 14 taken along the line 14B—14B of Figure 18.

Figure 15 is an enlarged vertical cross-sectional detail of the construction along adjacent edges of the two doors taken along the line 15—15 of Figure 9 with the doors in aligned position.

Figure 16:
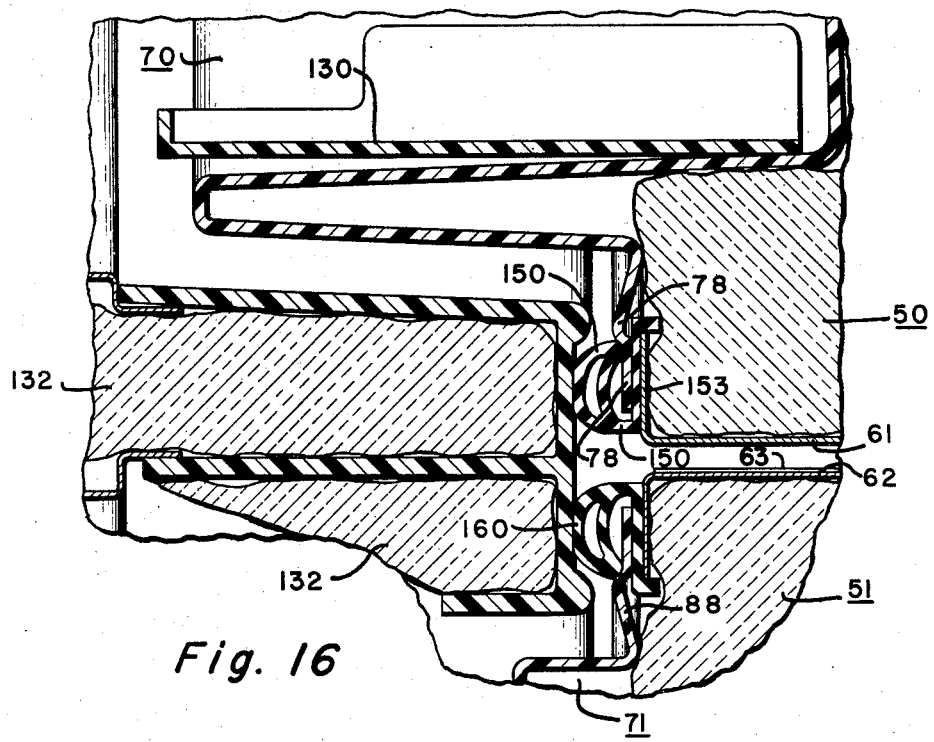

Figure 16 is an enlarged vertical cross-sectional detail taken along the line 16—16 of Figure 13, with the upper door in closed position.

Figure 17:
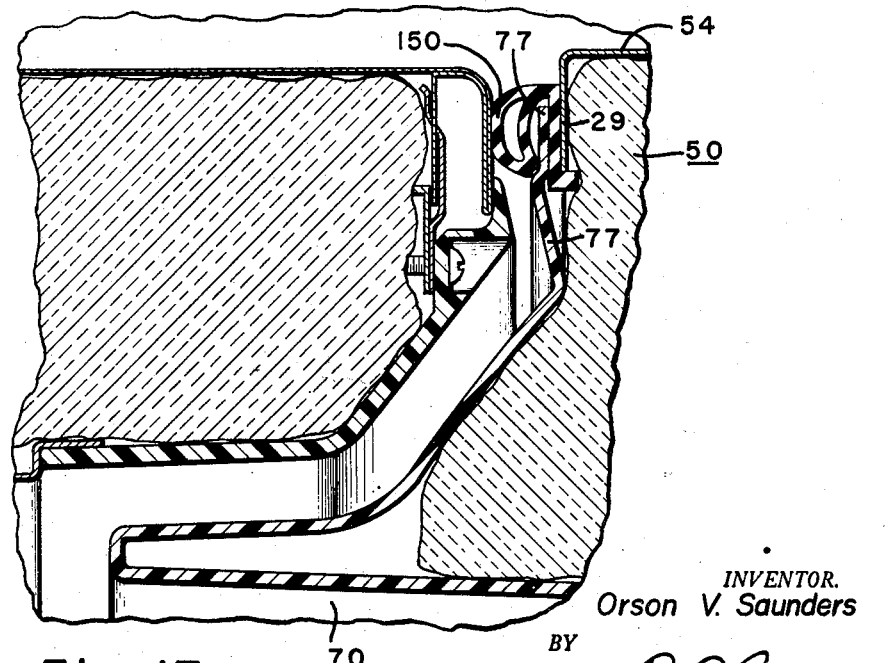

Figure 17 is an enlarged vertical cross-sectional view taken along the line 17—17 of Figure 13, with the upper door in closed position.

Figure 18 is an enlarged elevation of the two-door refrigerator with the doors in open position to show the hinge construction, and with certain parts broken away to show details of the inner construction of the doors.

The method of manufacturing quantities of substantially similarly sized refrigerators, some of which have a single outer front door covering a certain front area of such refrigerators, is indicated by the steps diagrammatically shown in Figures 1 through 6. The method also includes the manufacture of other substantially similarly sized refrigerators which have two separate adjacent outer front doors covering substantially the same sized front area as the single door, and using a substantial amount of the same equipment which is used for the manufacture of the single door, and is indicated by the steps shown in Figures 2–A through 6–A.

In practicing this method, quantities of sheet metal blanks 20 of Figure 1 are drawn into quantities of pans 21 of Figure 2 by well known drawing equipment. These pans have four cup-shaped edges 22, 23, 24 and 25 indicated in Figures 3 and 3–A. Some of these cup-shaped edges are inwardly flanged by flanging equipment now well known, as indicated at 26, 27, 28 and 29 in Figures 3 and 3–A.

The pans, which have progressed to the step indicated in Figure 3, are then forwarded for production into single doors, as diagrammatically indicated by the line 40. These pans are assembled with completing door parts and with some of the refrigerators to be manufactured, as indicated in Figures 4 through 6, to produce completed refrigerators having single outer front doors, shown in Figure 6.

Briefly, in the manufacture of single door refrigerators, a T-shaped brace section 41, as indicated in Figure 4, is inserted in the pan 21, and thereafter mating facing material 45 (Figure 5), in the form of a pan-shaped plastic inner face, together with an additional plastic plate 46 (Figure 6), are attached to the four flanged edges 22 through 25 to form the large single doors which are used in manufacturing the completed refrigerators indicated in Figure 6. Further details of such refrigerators are herein elsewhere disclosed.

Other of the pans 21 of Figure 2 are selected for production of the two-door refrigerators, as indicated by the line 30 and have holes 31 pierced in them in a line from one edge to another edge of the pan, as indicated in Figures 2-A and 3-A. Thereafter, their cupped edges 22, 23, 24 and 25 are inwardly flanged as indicated at 26, 27, 28 and 29 of Figure 3-A.

Some of the same equipment which is used in similar steps of the single door manufacture is used in the manufacture of the double doors. For example, the drawing equipment for forming the pan of Figures 2 and 2-A is the same in both cases. Likewise, the flanging equipment to form the flanges indicated in Figures 3 and 3-A is the same in both cases. The savings in cost of equipment in this manner is very large, as will be realized by those skilled in the art.

The pans 21 of Figure 3-A, are forwarded to cutting equipment indicated in Figures 3-B and 3-C capable of cutting the pan 21 into two sections or pairs of complementary metal front faces 50 and 51, shown in Figure 4-A, each having three cupped edges indicated at 52, 53, 54 and at 55, 56 and 57 respectively, and each having an uncupped edge indicated at 58 and 59 respectively.

Figures 3-B and 3-C show the cutting operation. This may be performed by a pair of spaced shearing knives 90 and 91, which are carried by vertical reciprocable member 92. Two expansible cutting die members 93 and 94 are placed within the pan 21 and are expanded by the screw members 95 and 96 to hold the pan securely. The adjacent edges of the die members 93 and 94 are in cutting relationship with the knives 90 and 91, so that the pan 21 is cut as indicated in Figures 3-B and 3-C to form the faces 50 and 51 shown in Figure 4-A. Preferably, the knives 90 and 91 are spaced a distance sufficient to cut a small slab from the pan 21 sufficient to provide the necessary spacing between the upper and lower doors of the finished refrigerator so that the finished double doors cover substantially the same front area of the refrigerator as is covered by the single door.

In Figures 4-A to 6-A, these complementary metal front faces 50 and 51 are assembled with completing door parts and with some of the refrigerators to form quantities of completed refrigerators having two separate adjacent outer front doors.

In Figure 4-A, a T-shaped brace 41, similar to brace 41 previously referred to, is secured within the face 51. This brace also is made by the same tool equipment used in the manufacture of the single door refrigerators. Pairs of caps 61 and 62 are telescoped within the respective front faces 50 and 51, and are secured thereto, as by spot welding, as indicated by the arrows in Figure 4-A; and thereafter a trim cap 63 is secured over the cap 62, and trim cap 166 is secured outside cap 61. In the final step of manufacture, the caps 61 and 62 are closely adjacent and parallel to each other to reduce the amount of heat which can be transferred into the refrigerator at this point.

In Figure 5-A, inner plastic faces 70 and 71 are secured to the outer faces 50 and 51. Additionally, a plastic plate 72 (Figure 6-A) similar to or identical with plate 46 of Figure 6 is also secured to the outer face 51. The inner faces 71 and 72 form the inner mating rear facing material for the lower door, while the inner face 70 forms inner facing material for the upper door.

The upper mating rear facing material 70 has three edges 75, 76 and 77 secured to the three cupped edges 52, 53 and 54, at their respective flanges, as indicated by the line 80 in Figure 5-A. Additionally, a fourth edge 78 is placed adjacent to but spaced from the uncupped edge 58 of the front face 50 so that the upper door cap 61 covers or bridges the space between said uncupped edge 58 and the fourth edge 78.

Likewise, the lower mating rear facing material 71 and 72 has the edges 85 and 85a secured to the flange of the cupped edge 55. The edge 86 (Figure 6-A) is secured to the flange of cupped edge 56 (Figure 5-A) and the edges 87 and 87a (Figure 5-A) are secured to the cupped edge 57. The fourth edge 88 is placed adjacent to but spaced from the uncupped edge 59 (Figure 4-A) of the lower metal front face 51. The lower edge 88a of face 71 (Figure 5-A) and the upper edge 72a of plate 72 (Figure 6-A) are secured to bracket 41. The lower edge 72b of plate 72 (Figure 6-A) is secured to flange of cup-shaped edge 56 of face 51 (Figure 5-A). The lower door cap 62 covers or bridges the space between said last named uncupped edge 59 and said last named fourth edge. The caps 61 and 62, when on the finished refrigerator, are parallel and adjacent to each other.

The single door refrigerator may be completed in any desired manner, for example, as shown in Figures 5, 6, 7 and 11. The edges 22a, 24a and 25a (Figures 5 and 6) of inner face 45 may be secured respectively to the cupped edges 22, 24 and 25 of the pan 21, and the lower edge 100 of inner face 45 may be secured to the bracket 41. The inner plate 46 may be secured with its upper and lower edges 41a and 23a against the bracket 41 and edge 23, while its side edges 22b and 24b may also be secured to the side edges 22 and 24 of the pan 21.

The inner face 45 (Figure 11) may include a space 102 for bottles, etc., a hinged vegetable pan 103, hinged at 104, a receptacle 105 for eggs or the like, a receptacle 106 for butter and a receptacle 107 for cheese and the like, or any other desired containers.

The single door refrigerator cabinet 120 may have a low temperature freezing compartment 121, insulated from the remainder of the interior by insulation 122. Various shelves 123 etc. may be placed within the upper higher temperature compartment 124. Any suitable type of gasket material 125 may be secured on the inside of the door construction to seal against the refrigerated compartment edges 126 to prevent infiltration of air around the edge of the door. For example, the gasket material 125 may be of the form hereinafter disclosed for the double doors, and may be attached in the same manner. The space 127 at the bottom of the refrigerator may contain the compressor or condensing unit. A drain 128 may discharge defrost water on the pan 129, where it is evaporated by the heat of the condensing unit.

Further details of the upper and lower doors of the two-door refrigerator are shown in Figures 5-A, 6-A, 9, 10 and 12 through 18.

The upper mating face 70 (Figure 12) may contain various trays or shelves 130 and the upper door may seal the low temperature freezing compartment 131 which is insulated at 132 from the remainder of the refrigerated space. The lower compartment 133 can be the above freezing refrigerating compartment and may be provided with shelves 134 and various pans or receptacles 135 and 136 which are usually provided in such space. The inner mating face 71 may include a shelf 140 for bottles, etc. and shelves or compartments 141 for various containers for butter, cheese, etc. and compartment 142 for eggs and the like.

A rubber-like seal 150 may be secured around the inner edge of the upper door, as by screws 151 (Figures 14, 14-B and 15) which pass through the inner bend 152 of the seal 150 and into the flange 153 of the upper cap 61. The cap 61 also may have a flange 154 to which the trim 166 is secured by means of screws 167. The lower door may have a sealing strip 160 secured along the inner edge of the door as by screws 161 which pass through the inner bend 162 of the seal 160 and into flange 163 of the lower cap 62. The cap 62 may also be provided with a flange 164. The trim cap 63 may be secured to cap 62 by the screws 156.

The seal 150, as it runs around the inside of the upper door (Figures 5-A, 15, 16, 17), may be secured also to the flanges of the cup-shaped edges 52, 53, and 54 and to the flange 153 (Figure 15). Likewise the seal 160, as it runs around the inner edge of the lower door, may be similarly secured to the various flanges of the cooperating outer metal face 51.

The hinge construction is shown in detail in Figures 14 and 18.

The two-door cabinet, diagrammatically indicated in Figure 6-A, has a corner edge 180 with the front flange construction 181 shown in Figure 14. A backing hinge rod or member 182 is held in place by screws 183 passing through the cabinet rounded corner 185 into the member 182 behind the flange 181. Special hinge lugs or plates 184 are adapted to abut against the rounded corner 185 of the cabinet edge 180. The lugs or plates 184 are held by screws 183a which pass through plates 184 and corner 185 into member 182. Recesses 183b fit over the heads 183c of screws 183. A sufficient number of screws 183 and 183a are vertically spaced along the edge 180 to form a firm support for the hinge construction. A hinge plate 190 is secured to the flange 28 of the upper door 50. For example, a backing gusset 191 is placed behind the flange 28 of cupped edge 53, and a continuous serrated metal member 192 is placed behind the gusset 191 and is apertured and threaded to receive the screws 193 which pass through the hinge plate 190, flange 28a, gusset 191 and into the nut 192 to secure these parts together. The hinge pins 195 and 196 pass through the curved portions 197 of hinge plate 190 and suitable vertical holes in lugs or plates 184.

The inner bend 152 of seal 150 is cut away where the hinge plate 190 is attached to the door, as indicated in Figure 14. At that point, fiber 200 is placed under the hinge plate 190 as well as at all places under the seal. A metal plate 201 is placed over the inner plastic unit and has notch 202 to hold the seal 150 at that point.

The backing rod 182 may be extended downwardly along the length of the edge 180 of the cabinet, to receive a similar hinge construction for the lower door 51. If desired, the upper hinge for the lower door 51 may have the backing rod 182 integral with that of the upper door construction, and the backing rod may be discontinued below the upper hinge of the lower door, and a separate backing rod similar to rod 182 may be provided for the lower hinge of the lower door.

While the form of embodiment of the invention as herein disclosed constitutes a preferred form, it is to be understood that other forms might be adopted as may come within the scope of the claims which follow.

What is claimed is as follows:

1. The method of manufacturing two separate front doors for a refrigerator having two separate adjacent refrigerating compartments which comprises: drawing an outer pan adapted adequately to cover both of said compartments and having four cupped edges; piercing holes in a line from one edge to another edge of said pair corresponding to a dividing line between said compartments; cutting said pan along said holes to form a pair of complementary front pieces each having three cupped edges and an uncupped edge; and assembling said pairs of complementary metal front pieces with completing door parts to form said two separate front doors.

2. The method of manufacturing two separate front doors for a refrigerator having two separate adjacent refrigerating compartments which comprises: drawing an outer pan adapted adequately to cover both of said compartments and having four cupped edges; piercing holes in a line from one edge to another edge of said pan corresponding to a dividing line between said compartments; inwardly flanging said cupped edges; cutting said pan along said holes to form a pair of complementary front pieces each having three cupped edges and an uncupped edge; and assembling said pairs of complementary metal front pieces with completing door parts to form said two separate front doors.

3. The method of manufacturing two separate front doors for a refrigerator having two separate adjacent refrigerating compartments which comprises: drawing an outer pan adapted adequately to cover both of said compartments and having four cupped edges; piercing holes in a line from one edge to another edge of said pan corresponding to a dividing line between said compartments; cutting said pan along said holes to form a pair of complementary front pieces each having three cupped edges and an uncupped edge; and assembling said pairs of complementary metal front pieces with completing door parts, including pairs of complementary cups along said uncupped edges, to form said two separate front doors.

4. The method of manufacturing quantities of substantially similarly sized matched refrigerators, some of which have a single outer front door covering a front area of such refrigerators, and others of which have two separate adjacent outer front doors covering substantially the same sized front area, which comprises: drawing quantities of pans each of such shape and dimensions to form one face of said single outer front door; assembling some of said pans with completing door parts and with some of said refrigerators to form quantities of completed refrigerators having single outer front doors; cutting quantities of said pans each into matching sets of complementary metal front pieces each having three cupped edges and an uncupped edge; and assembling said sets of complementary metal front pieces with completing door parts, including sets of complementary caps along said uncupped edges, and with some of said refrigerators with said sets of complementary caps adjacent each other to form quantities of completed refrigerators having two separate adjacent outer front doors which match in contour the corresponding refrigerators with a single front door.

5. The method of manufacturing quantities of substantially similarly sized matched refrigerators, some of which have a single outer front door covering a front area of such refrigerators, and others of which have two separate adjacent outer front doors covering substantially the same sized front area, which comprises; drawing quantities of pans of the same size and shape with the same tool equipment, each of said pans being of such shape and dimensions to form a unitary front outer piece of said single outer front door; assembling some of said pans with completing door parts and with some of said refrigerators to form quantities of completed refrigerators having single outer front doors; cutting quantities of said pans each into matching sets of complementary metal front pieces each having three cupped edges and an uncupped edge; and assembling said sets of complementary metal front pieces with completing door parts and with some of said refrigerators to form quantities of completed refrigerators having two separate adjacent outer front doors which match in contour the corresponding refrigerators with single front doors.

6. The method of manufacturing two separate front doors for a refrigerator having two separate adjacent refrigerating compartments which comprises: drawing an outer pan of such shape and dimensions adequately to cover both of said compartments; cutting said pan into two sections, one of which sections is adapted adequately to cover one of said compartments and the other of which sections is of such shape and dimensions adequately to cover the other of said compartments; capping the cut portions of the sections, and assembling with said sections other respective door parts to form said two separate front doors.

7. The method of manufacturing a plurality of separate front doors for a refrigerator having a corresponding plurality of separate adjacent refrigerating compartments which comprises: drawing an outer pan of such shape and dimensions adequately to cover all of said compartments; cutting said pan into a corresponding plurality of sections, each one of said sections being of such shape and dimensions adequately to cover a corresponding refrigerating compartment; inserting in and fastening a cap in the cut end of each of the sections, applying and fastening a trim cap extending over and concealing a portion of the cap and the cut edges of the sections of said pan, and assembling with said sections other respective door parts to form said plurality of separate front doors.

References Cited in the file of this patent

UNITED STATES PATENTS

| | | |
|---|---|---|
| 763,663 | Edmiston | June 28, 1904 |
| 814,568 | Stagg | Mar. 6, 1906 |
| 1,210,553 | Sinnott | Jan. 2, 1917 |
| 2,272,119 | Jaeckel | Feb. 3, 1942 |
| 2,426,055 | Rundell | Aug. 19, 1947 |
| 2,509,611 | Phillip | May 30, 1950 |
| 2,513,043 | Nofzinger | June 27, 1950 |
| 2,553,832 | Richard | May 22, 1951 |
| 2,613,123 | Patten | Oct. 7, 1952 |